(12) United States Patent
Duff et al.

(10) Patent No.: US 12,073,610 B1
(45) Date of Patent: Aug. 27, 2024

(54) UNIVERSALLY TRAINED MODEL FOR DETECTING OBJECTS USING COMMON CLASS SENSOR DEVICES

(71) Applicant: CAPTURE LLC, San Diego, CA (US)

(72) Inventors: Eric Allen Duff, San Diego, CA (US); Amit Verma, San Diego, CA (US)

(73) Assignee: CAPTURE LLC, San Diego, CA (US)

( * ) Notice: Subject to any disclaimer, the term of this patent is extended or adjusted under 35 U.S.C. 154(b) by 0 days.

(21) Appl. No.: 18/410,603

(22) Filed: Jan. 11, 2024

Related U.S. Application Data

(60) Provisional application No. 63/510,134, filed on Jun. 25, 2023, provisional application No. 63/484,454, filed on Feb. 10, 2023.

(51) Int. Cl.
*G06V 10/80* (2022.01)
*G06V 10/764* (2022.01)

(52) U.S. Cl.
CPC .......... *G06V 10/803* (2022.01); *G06V 10/764* (2022.01)

(58) Field of Classification Search
CPC ............................ G06V 10/803; G06V 10/764
See application file for complete search history.

(56) References Cited

U.S. PATENT DOCUMENTS

| | | | |
|---|---|---|---|
| 11,481,918 B1* | 10/2022 | Ebrahimi Afrouzi | G01S 7/4804 |
| 2005/0100208 A1 | 5/2005 | Suzuki et al. | |
| 2013/0215388 A1 | 8/2013 | Imamura | |
| 2020/0051260 A1 | 2/2020 | Zhu et al. | |
| 2020/0272148 A1* | 8/2020 | Karasev | G01S 17/86 |
| 2021/0309248 A1 | 10/2021 | Choe et al. | |
| 2022/0192590 A1 | 6/2022 | Hillen | |
| 2023/0044620 A1* | 2/2023 | Shochat | G06T 7/0012 |

OTHER PUBLICATIONS

International Search Report and Written Opinion of the International Searching Authority directed to related International Patent Application No. PCT/US2024/011469, mailed May 22, 2024; 9 pages.

* cited by examiner

*Primary Examiner* — Utpal D Shah
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for training a universal sensor model based on a combined dataset provided by sensor devices of a common device class. Once trained, the universal sensor model may be deployed for providing recommendations based on performing object detection on datasets received from different types of sensor devices of the common device class. Embodiments include determining whether to generate the combined dataset from different datasets from sensor devices of the common device class and determining when the sensor model will perform better using the combined dataset from sensor device rather than a single dataset from a single sensor device. In some embodiments, the datasets are image datasets comprising image data provided by the sensor devices.

20 Claims, 5 Drawing Sheets

UNIVERSALLY TRAINED MODEL FOR DETECTING OBJECTS USING COMMON CLASS SENSOR DEVICES

RELATED APPLICATIONS

This application claims priority to U.S. Provisional Patent Application No. 63/484,454, filed on Feb. 10, 2023 and U.S. Provisional Patent Application No. 63/510,134, filed on Jun. 25, 2023, the contents of which are incorporated herein by reference in their entirety.

BACKGROUND

Field

This disclosure is generally directed to a novel universally trained sensor model for providing object recognition capabilities to different types of sensor devices that are within the same device class.

SUMMARY

Provided herein are system, apparatus, article of manufacture, method and/or computer program product embodiments, and/or combinations and sub-combinations thereof, for combining data from different types of sensor devices of a "common class" but different characteristics to train a universal sensor model to identify a target feature or features within future sensor data provided by the different types of sensor devices.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
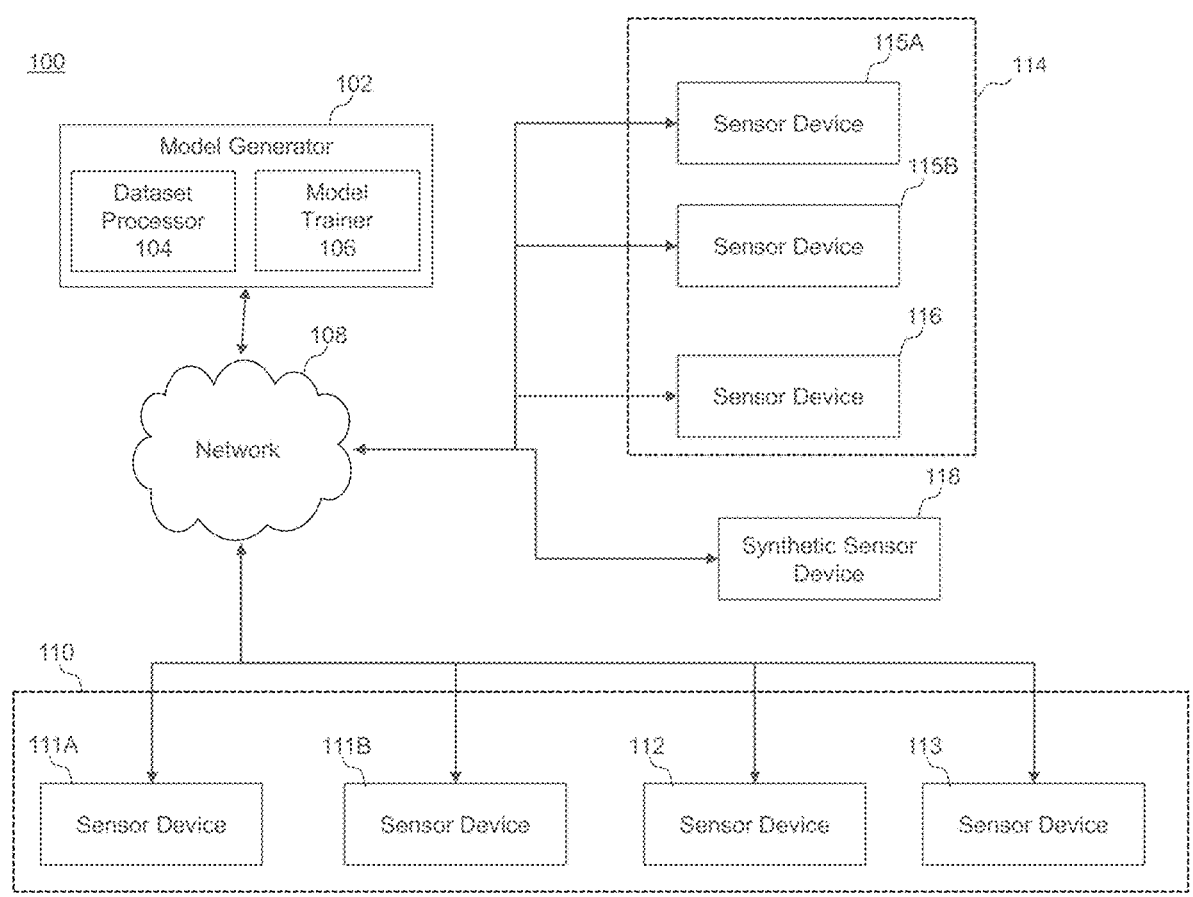
FIG. 1 illustrates a block diagram of a sensor device environment, according to some embodiments.

The present disclosure relates to methods for combining datasets provided by devices of a common class. The common class may comprise multiple different device types and therefore may comprise multiple devices of different device types. For the purpose of this disclosure, it is understood that references to devices within the same class generally refers to devices of multiple different device types within that class.

Devices within a class provide respective datasets, including image datasets, for creation of a combined dataset for training a universal sensor model to identify a target in the combined dataset. Examples of targets include, but are not limited to, specific feature(s) or object(s) in within the dataset, and could also mean empty data (e.g., empty spaces within an image). More specifically, in various embodiments, the present disclosure describes a method for determining the suitability for combining datasets; generating training and test datasets for a universal sensor model; and deploying the combined dataset in training and testing the universal sensor model and in using the combined universal sensor model in operational use for many devices.

In various embodiments, datasets comprise image data provided by devices within a class, such as image sensor devices. Image data includes, but is not limited to, any images that are captured or otherwise provided by such devices. Other examples of datasets include seismic or electromagnetic measurements applied to characterizing underground geological targets; such datasets may include topography data, seismic data including graphs, image data.

In various embodiments, devices of a common class include various scanning devices that generate images using various physical methods. In one embodiment, a common class of device includes computed tomography (CT) scanners. In various embodiments, one common class includes CT scanners for airport checked baggage. In various embodiments, another common class is CT scanners for airport checkpoint carry-on baggage. In various embodiments, the common class of device consists of CT scanners for airport checked baggage and synthetic computationally generated CT scanners that are created to produce images that closely resemble real data from physical CT scanners. In various embodiments, the common class of device consists of CT scanners for airport carry-on baggage and synthetic computationally generated CT scanners that are created to produce images that closely resemble real data from physical CT scanners. For purposes of this disclosure, "synthetic" data refers to data which is computationally generated without use of a physical sensor. This might often be done by computationally simulating the physical processes underlying the sensor function. Data which originated from some physical sensor but which has been computationally modified to have characteristics of a different physical sensor would not be synthetic data, but would be considered transformed data.

For the purposes of this disclosure, a device class describes an end-use application for devices within that class. As noted above, examples of a device class include, but are not limited to, CT scanners for checked luggage, CT scanners for carry-on luggage, and CT scanners for specific medical applications. In some embodiments, there may be a number of characteristics associated with the image datasets based on the device class of the device providing the image dataset. For example, devices make measurements that are appropriate, accurate, and precise enough to achieve the goal of the device class. This will be referred to as having key performance characteristics because they fulfill a minimum performance requirement. Producing a robust interpretive universal sensor model requires sufficient device data to show how the desired targets are depicted in the data. This is called "training data" and is the basis on which single-sensor-type and the universal sensor model (or models) may be developed and trained.

Device classes may include devices of different device types. A device type describes devices based on one or more construction or build characteristics of the devices within that class, such as based on their manufacturer or based on their model number. Accordingly, there may be multiple device types within the same device class. For example, there may be different types of CT scanners (e.g., different manufacturer, different sensor, different model) within the class of CT scanners for checked luggage. Additional examples of types of devices include, but are not limited to, sensor devices that are made by different manufacturers, sensor devices that use different image formation and/or compression algorithms, and sensor devices from the same manufacturers but are different models (e.g., different design, different sensor). Design differences may include but are not limited to differences in the source of interrogating energy (e.g. for a CT: x-ray source; for an MRI: magnetic field generator; for an optical system: light source), sensors, mechanical geometry, and methods by which the object enters the scanner and is scanned. Accordingly, different types of devices may produce similar output (e.g., CT systems produce voxel maps encoding measured density) but the output may have different characteristics that may result from the unique or different features of the sensor type, or from arbitrary engineering choices. As non-limiting examples, different types of CT sensors may produce density map outputs that differ in characteristics such as image resolution, voxel size, image dimensions, how numbers in the density map relate to physical density, density dynamic range, density precision, density accuracy, anomaly sensitivity, noise level/noise character, artifacts and/or other characteristics.

Certain embodiments describe a method for combining image datasets from one or more sensor device types of a particular class for the purpose of creating a combined image dataset from those devices, then using that combined image dataset to train an interpretive universal sensor model for performing subsequent target detection in response to receiving sensor data from the one or more sensor devices of that same class. Examples of a target in sensor data may include, but are not limited to, objects and signals in the sensor data. A target in sensor data may refer to characteristics of an entire image or objects within the image, such as objects in luggage. The universal sensor model is trained to accurately identify targets within image datasets provided by sensor devices of a particular class. Targets within image datasets include, but are not limited to, objects in the image dataset (e.g., different types of guns, different types of knives, different types of potential explosive devices or benign objects such as shoes) and/or features of those objects. Examples of such features include, but are not limited to, visual characteristics of the objects such as the size, shape, and dimensions of the object.

In some aspects, the universal sensor model may be implemented as a machine learning network. One example of such a network is an object detection network, such as a convolutional neural network. An object detection network is a machine learning model that detects and classifies objects in an image and is particularly suited for real-time object detection. In some embodiments, the universal sensor model may be implemented as a system that comprises a machine learning network in addition to other components for communicating inputs to and transmitting outputs from the machine learning network to external devices and performing transformation functions.

The universal sensor model may be trained to identify targets within image datasets provided by the devices. One field is the interpretation of images for security purposes, especially the detection of threat or contraband items concealed in luggage or other containers like vehicles, parcels, mail or cargo. For example, the sensor devices may be CT scanners distributed across different security checkpoints at different airport locations and the image datasets comprise imaging data taken by the CT scanners of passenger baggage on the conveyor belt. There may be different types of CT scanners at different locations and checkpoints and the universal sensor model is trained to process the image datasets from each type of CT scanner and configured to perform object detection of targets within the image datasets. In this embodiment, the targets are different items that are prohibited from being transported through the security checkpoint, such as different kinds of weapons and hazardous products.

Once trained, the universal sensor model is capable of accurately operating on output from different types of the sensor devices that are in the same class. As one example, consider an embodiment where the universal sensor model is trained on image datasets from different types of sensor devices that are in the same sensor class. Each of the image datasets may include a variety of objects, some of which are labelled as targets to be identified by the universal sensor model. In some aspects, once trained, the universal sensor model can operate on output from various types of sensor devices of the same sensor class, including devices that did not provide datasets for training the universal sensor model. In other words, the universal sensor model is trained to perform target recognition on datasets from any device, no matter the device type, within the device class. Accordingly, the universal sensor model may operate on output provided by a sensor device, potentially even if that sensor device did not provide any datasets to train the universal sensor model. This capability of the universal sensor model to respond to datasets provided by sensor devices within the same device class is bolstered by training the universal sensor model using a combined image dataset.

This is in contrast to training separate non-universal interpretive algorithms using separate datasets only from each specific sensor type which is current practice in many fields. This is typically done to reduce the range of characteristics that the algorithm must accommodate. This disclosure includes a process for determining when the universal sensor model will perform better using combined datasets from many device types rather than single device type data, as well as procedures for combining the datasets and implementing the resulting trained universal sensor model in an operational environment with any or all of the devices comprising many device types.

In some aspects, implementing the universal sensor model includes receiving input data from the one or more sensor devices to perform target detection within image datasets provided by the one or more sensor devices. In some aspects, input data may include the image datasets. In some aspects, receiving input data may initiate performing image recognition on the image dataset to identify one or more targets. In some aspects, the universal sensor model may include decision components to generate one or more actions in response to the one or more identified targets. In some aspects, the universal sensor model may send the one or more identified targets to a remote decision node which may generate the one or more actions or may just record the results. Continuing the example of implementing the sensor devices as CT scanners, image data may be transmitted by one or more CT scanners for the universal sensor model to detect any prohibited items within the image datasets provided by the one or more CT scanners. The universal sensor model may respond to the image data with a message indicating the presence (or lack) of any targets that are detected within the image dataset.

Combining Image Datasets

In some aspects, there may be a number of requirements for training data. For example, one requirement may be that the image dataset be of sufficient quantity that random variations in targets are sufficiently represented. For an object detection training method, this might refer to variations in placement and orientation of a target, as well as the context of the target (e.g. what other things are near it and in what positions). There may also be data quantity requirements related to random or systematic noise sources in the product.

In some embodiments, another requirement is that the image dataset be of sufficient variation to span the range of cases the universal sensor model needs to interpret. In such embodiments, a target detection training dataset would include specific samples of every target to be detected and every target that should not be detected. In some aspects, the dataset can include a collection of targets that are similar to the expected target(s) to be detected and others similar to expected target(s) to not be detected.

In some embodiments, another requirement is that the image dataset lacks bias. Bias refers to systematic patterns in the data that do not contribute to the goal of training the universal sensor model. For example, to illustrate the case of a machine learning system attempting to find certain targets in computer tomography (CT) scans of airport luggage, training image datasets consist of a combination of scans of real passenger stream of commerce bags that do not contain threats with scans of bags that were intentionally assembled to contain threat objects, then intentionally scanned. In such a training set, examples of bias might include an over- or under-inclusion of certain non-threat items in the threat bags, or patterns in how the threat bags are packed, an insufficient variety of baggage containers, different ways of placing the targets in the luggage (e.g., orientation, location, layered behind other targets), ways of scanning the luggage, and choice of luggage that lack the targets to be identified.

Another potential bias can arise when certain threat objects are more often presented near certain non-threat objects.

Another common bias in dataset generation is that the threat-object data is generally acquired using an off-line sensor device whereas the non-threat data comes from one or more systems in operational use. Since even within a sensor type there can be differences in the data generated between separate devices, it is possible that a resulting model may not be distinguishing threat contents from non-threat contents but rather data from the threat-acquisition device from data from the device(s) that acquired the non-threat data.

Figure 4:
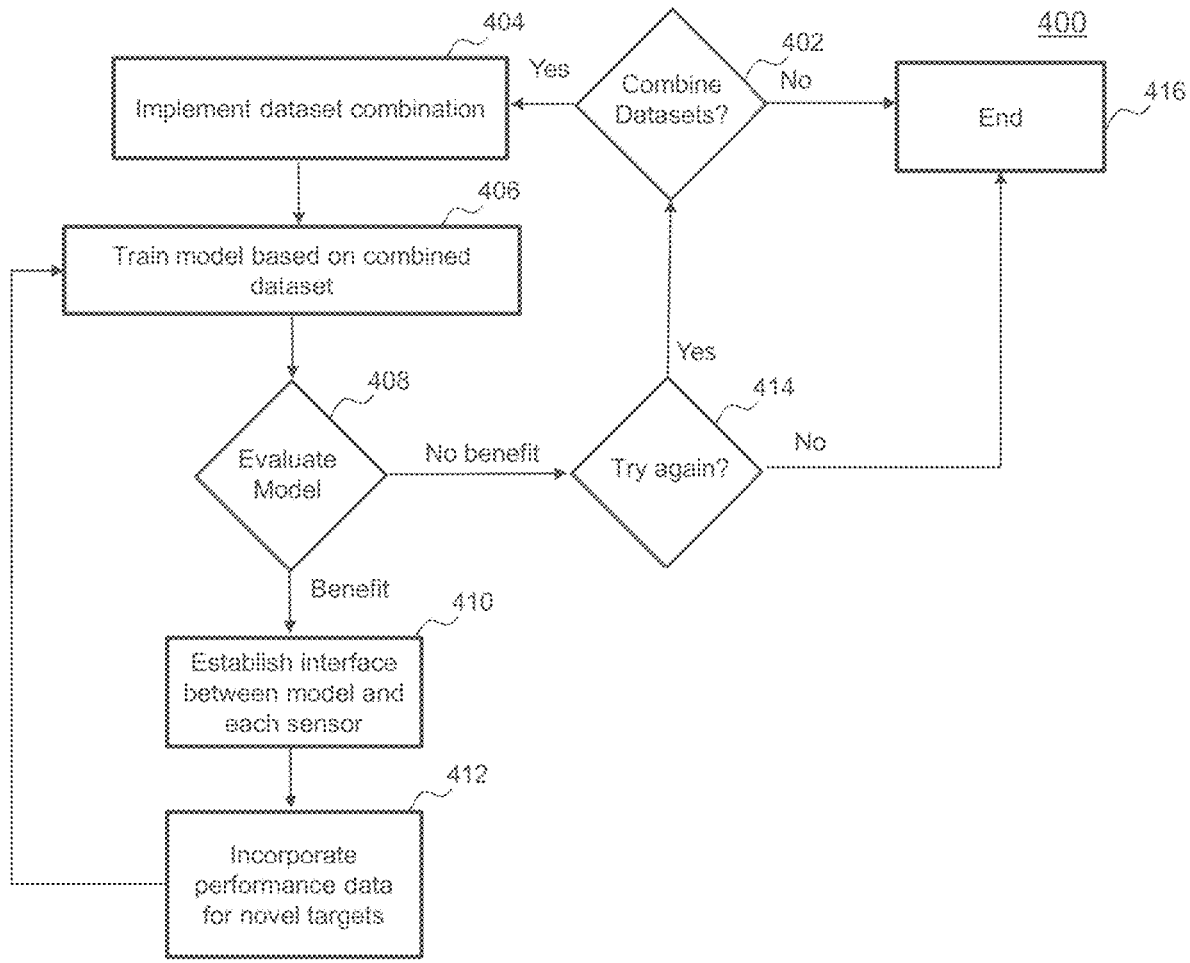
FIG. 4 is a flowchart illustrating a process for generating a combined image dataset for training a universal sensor model, according to some embodiments.

Because this disclosure benefits from the breadth improvements and bias reduction that results from combining single-sensor-type training datasets from a plurality of sensor types, specific steps and considerations for combining image datasets is discussed in more detail with regard to FIG. 4.

Various aspects of this disclosure may be implemented using and/or may be part of a sensor device environment 100 shown in FIG. 1. It is noted, however, that sensor device environment 100 is provided solely for illustrative purposes, and is not limiting. Aspects of this disclosure may be implemented using and/or may be part of environments different from and/or in addition to the sensor device environment 100, as will be appreciated by persons skilled in the relevant art(s) based on the teachings contained herein. An example of the sensor device environment 100 shall now be described.

Exemplary Training Environment

In a non-limiting example, sensor device environment 100 may be directed to training a universal sensor model that can process data from multiple types of sensor devices of a common sensor class. Sensor device environment 100 may include a model generator 102 for receiving image datasets from sensor devices in a first device class 110 (e.g., sensor devices 111A, 111B, 112, and 113) and sensor devices in a second device class 114 (e.g., sensor devices 115A, 115B, and 116), and synthetic sensor device 118. In some aspects, model generator 102 may be implemented as a remote device and configured to receive the image datasets over a network 108.

Model generator 102 is configured to manage the complexity of using image datasets that contain different characteristics from different device types of a device class 110 and device class 114. Device class 110 may be a different class (e.g., CT scanner for checked baggage) than device class 114 (e.g., CT scanner for carry-on baggage). Device class 110 may include sensor device 111A, sensor device 111B, sensor device 112, and sensor device 113. Sensor device 111A and sensor device 111B may be the same device type (e.g., same model and manufacturer) and different from the device types of sensor device 112 and sensor device 113. Sensor device 112 may be a different device type than sensor device 113. One would understand that the number of devices depicted in FIG. 1 is merely exemplary and that device class 110 may include any number of different devices and device types.

Similarly, device class 114 may include sensor device 115A, sensor device 115B, and sensor device 116. In some aspects, sensor device 115A is the same device type as sensor device 115B, and sensor device 115A and sensor device 115B are different device types to sensor device 116. Devices in the same device class provide image datasets to model generator 102 which is configured to form a combined image dataset that can be used for training a single universal sensor model that can interface with any type of sensor device of the same common class that contributed to the combined dataset.

Combining image datasets from different types of sensor devices is based on sensor devices being of the same common sensor class (e.g., intended for the same particular application and/or otherwise providing an adequate key performance characteristics), and that they all satisfy a minimum performance level for that particular sensor class to perform the intended goal. Note that this may be a formal published standard or may be informal, deriving from the demands of the particular application and/or purpose.

Model generator 102 may include a dataset processor 104 for combining the image datasets based on different criteria and methods and a model trainer 106 for training a universal sensor model for each sensor class based on the combined image datasets provided by dataset processor 104.

In some embodiments, model generator 102 may receive image datasets associated with one or more sensors of a common sensor class, such as sensor device 111A, sensor device 111B, sensor device 112, and sensor device 113. Dataset processor 104 may be configured to perform steps for determining whether combining the image datasets would be beneficial for training the universal sensor model and, if so, combining the image datasets to generate a combined image dataset. The steps for making this determination are discussed in further detail with regard to FIG. 4.

In some embodiments, model trainer 106 may test the universal sensor model after it has been trained. Overall performance of the universal sensor model can be tested using a test set that is independent of the training set within the combined image dataset. For example, to compare the performance of a given single sensor model to that of the universal sensor model, the universal sensor model performance can be measured using a single device type image dataset (i.e., not the combined image dataset from all the device types combined).

Concluding whether the combined universal sensor model is beneficial compared with using one or more single-device-type sensor models may require comparison of the tested performance results in the context of other practical considerations, i.e., operational considerations, operational benefits, or that the tested overall performance of the universal sensor model trained on a combined image dataset can be regarded with more confidence than a model trained on an image dataset from a single sensor device type because the universal model has been trained and tested on more diverse and varied training data than a single sensor model (e.g., single-sensor-type test datasets may omit examples of specific threat objects present in the datasets for other sensor types).

In some embodiments, model generator 102 may be implemented on a device remote from sensor devices over a network 108 as depicted in FIG. 1. In other devices, model generator 102 may be implemented locally, such as in one or more of the sensor devices, such as sensor device 111A, sensor device 111B, sensor device 112, and sensor device 113.

As noted above, sensor device 111A, sensor device 111B, sensor device 112, and sensor device 113 may be part of the same device class but a different class from sensor device 115A, sensor device 115B, and sensor device 116. A device class may share adequate key performance characteristics. In some aspects, each sensor device of sensor devices 110A-110D and sensor devices 112A-112C may have existing training and test image datasets for their particular type and the application (e.g., providing image datasets for airport security, medical applications). In some aspects, devices of a device class are required to satisfy the same minimum key performance characteristics. Model generator 102 may be configured to receive the one or more training image datasets associated with any sensor device and organizing the image datasets based on the common type and/or class of the sensor device.

Combining the various image datasets for devices within the same device class and/or for each sensor type within the same device class provides a number of improvements to existing sensor environments including larger and more robust datasets with a larger number of representative targets, more variation of the representative targets, and having less bias. Though bias in image datasets is inevitable, it is unlikely that identical biases would exist in each individual device type image dataset. Thus, many biases in one device type dataset will be substantially diminished by combination with other image device type datasets that lack the same bias.

In some embodiments, sensor device 111A, sensor device 111B, sensor device 112, and sensor device 113 are different types of the same sensor device class. For example, sensor device 111A, sensor device 111B, sensor device 112, and sensor device 113 may be implemented as CT scanners for checked luggage and sensor device 115A, sensor device 115B, and sensor device 116 may be implemented as CT scanners for carry-on luggage. Each of the sensor devices may be different types within their respective classes, such as having different image sensors, different image dataset characteristics, and/or different manufacturers.

In some embodiments, dataset processor 104 may be configured to generate the combined image dataset based on a combination of image datasets from "actual" or real sensors (e.g., sensor devices 110A-110D) and image datasets from synthetic sensor device 118. Synthetic sensor device 118 may be implemented as a computational system that generates synthetic data having similar characteristics to other sensor devices. The image datasets generated by synthetic sensor device 118 may be digitally produced to emulate image datasets provided by actual sensor devices or as a unique sensor device type different from actual sensor devices. Synthetic sensor device 118 may be tuned to generate image datasets having desired characteristics such as specific views or images of targets or features, specific image artifacts, and/or specific image properties.

Training the universal sensor model based on synthetic image datasets having specific desired characteristics can be useful operationally to upgrade the universal sensor model to perform on new real targets similar to the synthetically generated objects without requiring acquisition of image datasets of those real targets from real sensor devices. For example, if one of the "sensor types" on which the universal sensor model is trained is partly or solely synthetic data, then synthetic data for the unique target can be used to train the universal sensor model to respond to sensor data from all sensor devices to detect the similar targets even if that target has not yet been provided in any of the prior training image datasets from those sensor devices.

Exemplary Universal Sensor Model Environment

Figure 2:
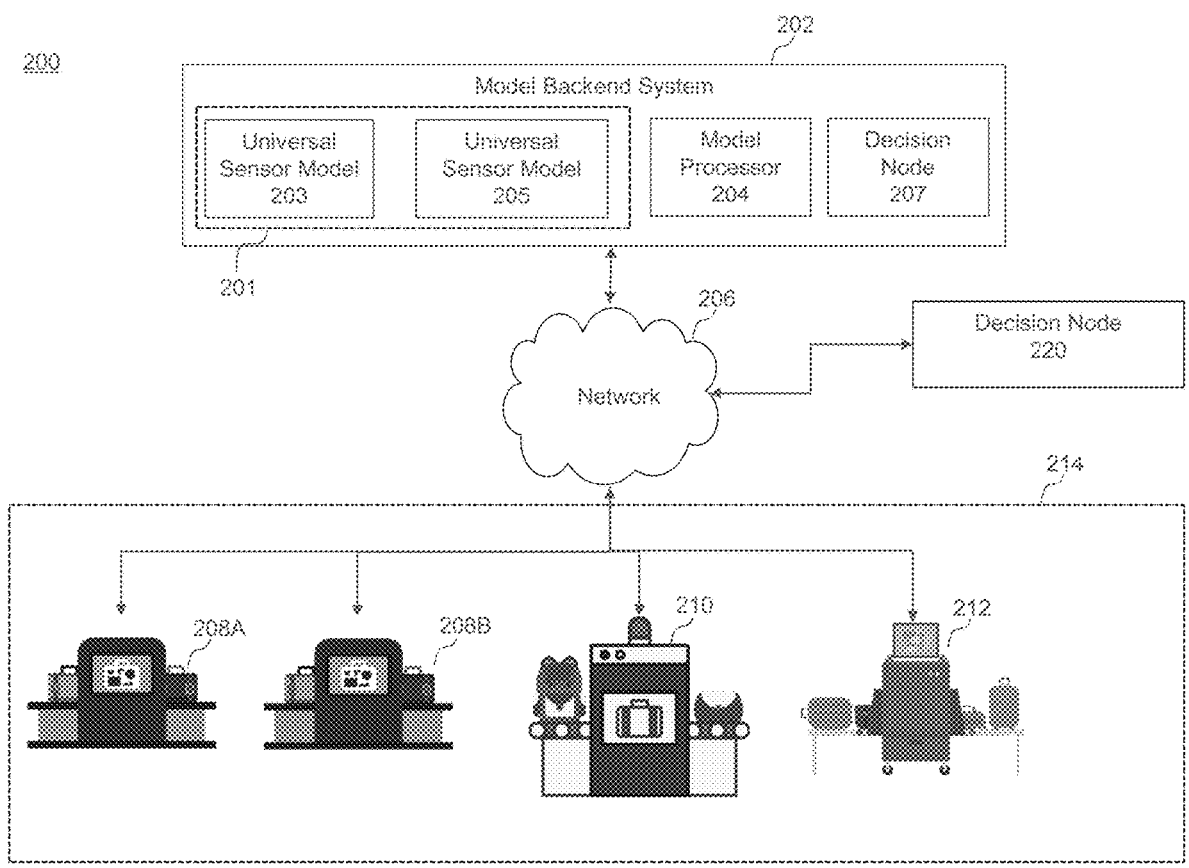
FIG. 2 illustrates a block diagram of a universal sensor model environment, according to some embodiment.

Various aspects of this disclosure may be implemented using and/or may be part of a universal sensor model environment 200 shown in FIG. 2. It is noted, however, that universal sensor model environment 200 is provided solely for illustrative purposes, and is not limiting. Aspects of this disclosure may be implemented using and/or may be part of environments different from and/or in addition to the universal sensor model environment 200, as will be appreciated by persons skilled in the relevant art(s) based on the teachings contained herein. An example of the universal sensor model environment 200 shall now be described.

In a non-limiting example, universal sensor model environment 200 may be directed to implementing a model backend system 202 that can include storage 201, such as a database, to store multiple universal sensor models, each one configured to interface with sensor devices of a particular sensor class. Model backend system 202 may further be configured with a model processor 204 which is configured to process, at run-time, data that is being provided to model backend system 202. Model backend system 202 may communicate with one or more devices, such as the devices in device class 214, via a network 206. In some embodiments, model backend system 202 may be implemented within a computing device, such as a server or database.

Model backend system 202 may also communicate with one or more decision nodes, which may be configured to receive the output of a universal sensor model and generate one or more recommendations based on the output of the universal sensor model or to merely receive and save the output. In some aspects, a decision node may be implemented locally with the model backend system 202, such as decision node 207. In some aspects, a decision node may be implemented remotely from model backend system 202, such as decision node 220; for example, decision node 220 may be co-located with one or more sensor devices. Decision node 220 may be implemented as a computer with a display for displaying the outputs of the universal sensor model and one or more recommendations for acting on any identified targets.

As one non-limiting example, CT scanner 208A may be implemented as a CT scanner for carry-on baggage at an airport and a decision node may be co-located with CT scanner 208A. CT scanner 208A may transmit image datasets to universal sensor model 203 (which has been trained on image datasets from multiple CT scanners for carry-on baggage). Examples of objects in the image datasets are objects within any carry-on baggage that are being scanned by CT scanner 208A. The transmission of the image datasets from the CT scanner 208A to universal sensor model 203 may occur in real-time, on a predetermined schedule, or a combination of both. Model processor 204 may cause the universal sensor model 203 to process the image datasets to identify one or more targets within the image datasets. In this example, one or more targets may include any items prohibited from airplanes such as weapons. Output of the universal sensor model may include the one or more identified targets. In some aspects, the output may include annotations such as suggested labels (e.g., gun, knife) for the one or more identified targets. Other non-limiting examples of labels include a target location, target size, target bounding box, and shaded voxels (if an image dataset) to indicate the one or more identified targets. Model processor 204 may then route the output of universal sensor model 203 to one or more decision nodes. The output may trigger one or more rules or conditions that result in generating a recommendation or decision for display by the decision node. Examples of the recommendation include performing a manual search of the baggage that contains the one or more identified targets.

Although four sensor devices are depicted in FIG. 2, it is understood that universal sensor model environment 200 is not limited to this number and may implement any number of sensor devices.

Although not depicted, in some aspects, a decision node may be implemented as a component of a sensor device, such as any of first CT scanner 208A, a second CT scanner 208B, a third CT scanner 210, and a fourth CT scanner 212.

Although only two decision nodes are depicted in FIG. 2, it is understood that universal sensor model environment 200 may implement any number of decision nodes, locally or remotely, from model backend system 202. As one non-limiting example, there may be a decision node co-located with sensor devices, such as a first CT scanner 208A, a second CT scanner 208B, a third CT scanner 210, and a fourth CT scanner 212

Model backend system 202 may include any number of universal sensor models including universal sensor model 203 for interfacing with a first class of sensor devices and universal sensor model 205 for interfacing with a second class of sensor devices. Each of universal sensor model 203 and universal sensor model 205 are configured for receiving sensor data from various types of sensor devices associated with the particular sensor class on which the model was trained. As a non-limiting example, universal sensor model 203 may be trained based on image sensor data from CT scanners associated with carry-on luggage while universal sensor model 205 may be trained based on image sensor data from CT scanners associated with check-in luggage.

For example, universal sensor model 203 may be trained on image datasets from one or more CT scanners and may therefore be configured to receive and respond to sensor data from different types of CT scanners within a device class 214, such as a first CT scanner 208A, a second CT scanner 208B, a third CT scanner 210, and a fourth CT scanner 212. First CT scanner 208A and second CT scanner 208B may be implemented as the same device type but different types from, third CT scanner 210, and fourth CT scanner 212. One would understand that the devices shown in FIG. 2 are merely exemplary and that a device class may include multiple instances of the same device type, of different device types, or a combination of both.

In some embodiments, training datasets for universal sensor model 203 can be provided by devices of a device class that are different from the devices that utilize universal sensor model 203. For example, image datasets for training universal sensor model 203 may be generated or otherwise provided by a first set of CT scanners while a second set of CT scanners may submit inputs to the universal sensor model 203 after it has been trained.

As a non-limiting example, universal sensor model 203 may be trained to detect targets from image datasets provided from devices within the same device class. As another non-limiting example, universal sensor model 203 may be trained to detect certain targets on a combined image dataset based on image datasets only provided by first CT scanner 208A and second CT scanner 208B and third CT scanner 210 but not from fourth CT scanner 212. Examples of targets in this example include any prohibited targets such as weapons and explosive devices or any other kind of prohibited contraband or dangerous material, or target of interest as determined by the end user. Universal sensor model 203 may establish an interface between all CT scanners of the same class (e.g., checked-in luggage) and be configured to receive input data (e.g., datasets) from each of the CT scanners via the interface. In response to receiving the input data, universal sensor model 203 may perform target recognition within the image datasets.

In some aspects, utilizing a combined dataset for training the universal sensor model 203 may provide additional improvements including the capability of the universal sensor model 203 to respond to sensor data from any type of sensor device within the same sensor class even if the universal sensor model 203 was not trained on image datasets provided by each type of sensor device in that sensor class (e.g., fourth CT scanner 212 in this example).

Continuing the example, after the universal sensor model 203 has been trained, any one of first CT scanner 208, second CT scanner 210, and third CT scanner 212 may transmit data to universal sensor model 203. The universal sensor model 203 may perform target detection on the image dataset in the input data and provide a response indicating the result of the target detection such as whether any targets were identified in the image dataset.

The model backend system 202 may implement an interface for receiving data from sensor devices including one or more of a first CT scanner 208A, a second CT scanner 208B, a third CT scanner 210, and a fourth CT scanner 212. The elements of the interface may comprise receiving image datasets from each single sensor devices (image datasets will have the characteristics of the individual sensor device from it was derived), applying the sensor device specific transformations (described in more detail below) to the data, and running the universal sensor model on the transformed image dataset to produce the desired output.

In some aspects, output from a universal sensor model may be expressed according to the single sensor device characteristics. Accordingly, a reverse-transform associated with the single sensor device can be applied to the output of the universal sensor model to convert the output into an output that represents the single sensor device characteristics. As a non-limiting example, when the sensor devices are implemented as CT scanners, the location and size of a detected targets of the universal sensor model may be transformed so that the output is expressed in the coordinate system and distance measures of the single sensor device to allow the output of the universal sensor model to be superimposed on the original image from the single sensor device.

In some aspects, output from a universal sensor model may be expressed according to the transformed characteristics of the universal sensor model.

Exemplary Methods of Operation

Figure 3:
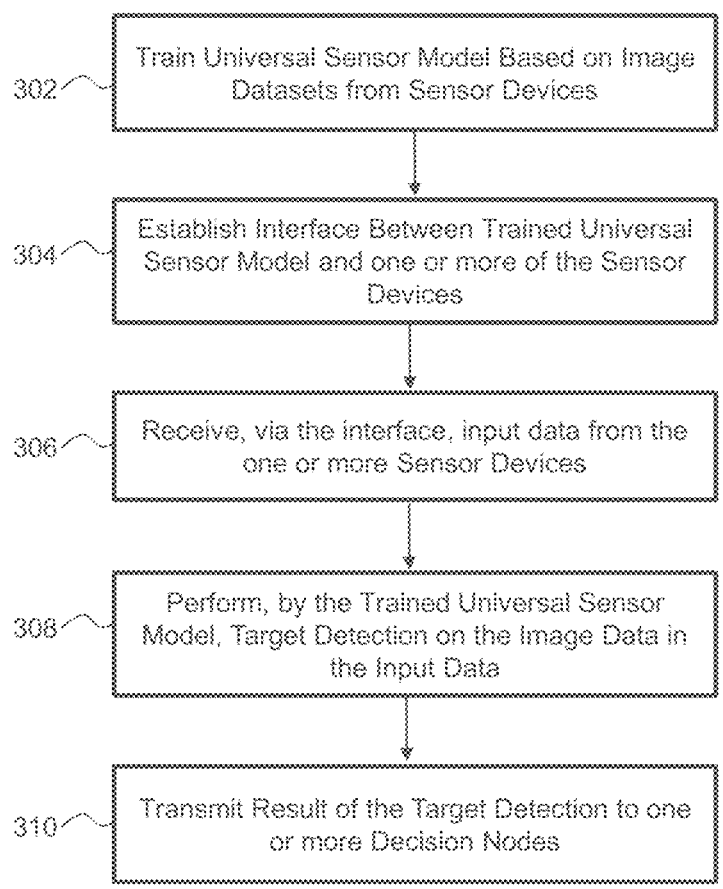
FIG. 3 is a flowchart illustrating a process for operations of a universal sensor model, according to some embodiments.

FIG. 3 is a flowchart illustrating a process for operations of a universal sensor model, according to some embodiments. Method 300 can be performed by processing logic that can comprise hardware (e.g., circuitry, dedicated logic, programmable logic, microcode, etc.), software (e.g., instructions executing on a processing device), or a combination thereof. As a non-limiting example of FIGS. 1-2, one or more functions described with respect to FIG. 3 may be performed by a device in communication with sensor devices (e.g., any of sensor devices 110A-110D, 112-A-C, or a remote server). In such an embodiment, any of these components may execute code in memory to perform certain steps of method 300 of FIG. 3. While method 300 of FIG. 3 will be discussed below as being performed by certain components of sensor training environment 100, other components may store the code and therefore may execute method 300 by directly executing the code. Accordingly, the following discussion of method 300 will refer to components of FIGS. 1 and 2 as an exemplary non-limiting embodiment. Unless otherwise stated, reference to devices means devices of multiple different types within the same class, such as sensor device 111A, sensor device 112, and sensor device 113. Moreover, it is to be appreciated that not all steps may be needed to perform the disclosure provided herein. Further, some of the functions may be performed simultaneously, in a different order, or by other components than shown in FIG. 3, as will be understood by a person of ordinary skill in the art.

In 302, model trainer 106 trains a universal sensor model based on a combined image dataset. The combined image dataset is based on image datasets received from one or more sensor devices of a common sensor class. The process for combining the image datasets is discussed in more detail in FIG. 4. Model trainer 106 produces a trained universal sensor model, such as universal sensor model 203 or universal sensor model 205, that is trained to process sensor data from one or more sensor devices of one or more sensor types associated with the common sensor class. Model trainer 106 may train a universal sensor model for each sensor class that provides image datasets to the model generator 102. Accordingly, model trainer 106 may implement any number of trained universal sensor models based on the number of sensor classes in communication with the model trainer 106.

In 304, the trained universal sensor model communicates via an interface that is established between the trained universal sensor model and one or more sensor devices associated with the particular class of sensor devices. The interface enables image datasets, and responses to be transmitted between the trained universal sensor model and decision nodes. In some embodiments, model backend system 202 may receive the sensor data, determine the sensor class associated with the sensor data, and route the sensor data to the universal sensor model that is associated with the determined sensor class. In this manner, multiple trained universal sensor models may be centrally implemented at model backend system 202. In other embodiments, the trained universal sensor model may be co-located with the respective sensor device and the interface between the trained universal sensor model and the sensor devices may be locally implemented. In yet other embodiments, the trained universal sensor model may be implemented as software within each respective sensor device and therefore a network connection between the trained universal sensor model and the sensor devices may not be necessary in all embodiments.

In 306, the trained universal sensor model receives, via the interface, input data from sensor devices associated with the same sensor class as the trained universal sensor model. The input data may include image datasets to be processed by the universal sensor model. In some aspects, input data may trigger a corresponding universal sensor model to process the input data. That is, the input data may trigger the universal sensor model to identify any targets within the image datasets. As one example, image datasets provided by CT scanners implemented at airport security checkpoints may be provided to a universal sensor model for performing target detection to identify any targets.

In 308, the trained universal sensor model may perform target detection on the image data provided in the input data by the one or more sensor devices. In some embodiments, the trained universal sensor model may transform the image datasets prior to performing the target detection because the image datasets may have image characteristics that are particular or unique to the individual sensor devices. In such embodiments, the universal sensor model may apply sensor device-specific transformations (or sensory type specific transformations) to the received image datasets. In other embodiments, the universal sensor model may be implemented as a system comprising a component for performing the transformations separate from a component that performs the target detection function (e.g., a machine learning network).

The purpose of the transformation step is to harmonize image characteristics of the image datasets provided by the different types of sensor devices. That is, image output from different types of sensor devices may have different characteristics (e.g., resolution, color, artifacts). Accordingly, model trainer 106 may be configured with image transformations to apply to image datasets as needed as part of the training process. Specific steps of this transformation are discussed with respect to FIG. 4.

In 310, the trained universal sensor model transmits results of the target detection to one or more decision nodes. As noted above, decision nodes may be implemented as a component of a sensor device, co-located locally with the trained universal sensor model, and/or on a remote device that may be co-located with one or more sensor devices. The results of the target detection may indicate whether any targets were identified within the image dataset that was included in the input data. In some embodiments, the result may include an image or location of a detected target. In some embodiments, the result may include an annotated image that includes an image of the detected target along with a label indicating a name of the detected target. In some embodiments, the annotated image may include one or more labels along with a corresponding confidence score that the detected target is correct. In some embodiments, the result may include the location of the detected target within the image but not the image.

FIG. 4 is a flowchart illustrating a process for generating a combined image dataset for training a universal sensor model, according to some embodiments. Method 400 can be performed by processing logic that can comprise hardware (e.g., circuitry, dedicated logic, programmable logic, microcode, etc.), software (e.g., instructions executing on a processing device), or a combination thereof. As a non-limiting example of FIGS. 1-2, one or more functions described with respect to FIG. 4 may be performed by a device in communication with sensor devices (e.g., any of sensor devices 110A-110D, 112-A-C, or a remote server). In such an embodiment, any of these components may execute code in memory to perform certain steps of method 400 of FIG. 4. While method 400 of FIG. 4 will be discussed below as being performed by certain components of sensor device environment 100, other components may store the code and therefore may execute method 400 by directly executing the code. Accordingly, the following discussion of method 400 will refer to components of FIGS. 1 and 2 as an exemplary non-limiting embodiment. Unless otherwise stated, reference to devices therefore means devices of multiple different types within the same class, such as sensor device 111A, sensor device 112, and sensor device 113. Moreover, it is to be appreciated that not all steps may be needed to perform the disclosure provided herein. Further, some of the functions may be performed simultaneously, in a different order, or by the same components than shown in FIG. 4, as will be understood by a person of ordinary skill in the art.

In 402, model trainer 106 generates a training dataset for training a universal sensor model by determining whether to create a combined image dataset based on image datasets provided by one or more sensor devices of the same sensor class. In some embodiments, this determination includes determining whether combining datasets would be feasible and productive for a particular application. This determination may be based on one or more factors.

A first possible factor for determining whether dataset-combining would be productive for a particular application is whether there exists a class of sensor devices suitable for that application. As a non-limiting example, there may be two datasets simulating two synthetic image scanning sensor types, which both produce image datasets, but contain different artifacts, scaling, and image sizes. These two sensor device types may be considered part of a sensor class that is suitable for dataset combining because they both have adequate key performance characteristics needed to produce data of sufficient quality for training a universal sensor model. As another non-limiting example, one dataset may simulate a synthetic image scanning sensor type and another dataset may comprise data from an actual sensor.

A class may be defined as more than one sensor type that has an adequate set of key performance characteristics suitable for a given application. Key performance characteristics are characteristics of the sensor device and the dataset it produces that assure that it will be effective for the end user's desired application. In a preferred embodiment where sensor devices are implemented as imaging sensor devices for the purpose of detecting or characterizing objects or regions of objects, these key performance characteristics may include the imaging resolution of the images produced (i.e., how small a feature is reliably evident in the image dataset) and the contrast (i.e., what size variations in the parameters measured is reliably evident in the image dataset), noise and artifacts. Other characteristics such as the image dimensions or voxel sizes may not be key performance characteristics themselves but might impact key performance characteristics.

Whether a given sensor device belongs to a class for a given application can be determined quantitatively by measuring the key performance characteristics of the sensor device and comparing those characteristics with the requirements of the application. As a non-limiting example related to the imaging resolution requirement for an imaging sensor device applied to object detection of an image dataset (e.g., detecting explosive material or a tumor), the sensor imaging resolution and contrast could be measured using a test object containing features of a range of sizes and contrast. Depending on the image modality, contrast may refer to variation in the parameter being measured, which might be density, effective atomic number for a CT system, integrated attenution for various kinds of transmission radiography, magnetic resonance for MRI systems. The resulting measurements may be compared with the known feature sizes and contrast levels required by the application (e.g., checked bag airport security, carry-on bag airport security, medical imaging).

Alternatively, a class of sensor devices can be inferred from the fact that they are all applied in current use for the same application, or were intended to be used for the same application. A non-limiting example of this would be CT scanners currently used by the United States Transportation Security Agency ("TSA") for the detection of prohibited items, such as explosive materials in checked bags, and approved for use by a regulatory authority for the same application. There are a number of CT scanner products certified/approved by the TSA for this purpose and they can be presumed to comprise a class for purpose of this disclosure. As another non-limiting example, there are other CT scanner products certified by the TSA for the application of identifying prohibited items and explosives in airport passenger carry-on luggage. Sensor devices for carry-on luggage versus sensor devices for checked luggage may comprise a different class of sensor devices since the products undergo regulatory approval for each application independently.

Another factor that can be considered is determining whether there are datasets from each sensor devices that are suitable for the application once a class of devices has been identified. One factor for datasets is that they contain sensor data spanning a range of objects, signals, targets, etc., that the universal sensor model will be trained to identify. This range of objects may be called "targets" of the universal sensor model. For imaging sensor devices to be used in an object or feature identification application such as airport security, an image dataset would likely contain images typical of the application. For example, the image dataset may include the images of various luggage and its contents. In some aspects, the image dataset may also contain examples of the targets to be identified as well as images that do not contain any targets representing stream of commerce bags. Another factor for datasets is that the dataset may also include "ground truth" information, i.e., an identification of the targets in the dataset including any identification (or labels) of the target that the universal sensor model should produce.

As a non-limiting example, in a dataset for an object detection application for imaging sensor devices, ground truth data may identify each target and together with information about the object such as its type, location, size, orientation, within the image data. These same requirements may apply to synthetic sensor devices that generate synthetic data. Combining datasets from multiple sensor devices will improve the capability of the universal sensor model by increasing the number of objects (and targets) on which the universal sensor model is trained and decreasing bias, This will improve the model to respond to any sensor type of the common sensor class on which the universal sensor model was trained.

Another factor for determining whether dataset-combining would be productive for a particular application is the quality of each dataset should be evaluated, and also the extent to which a combination of the datasets would be superior to the individual datasets. In embodiments where only a single dataset is present (i.e., only one sensor device has provided image dataset for training), this determination includes whether a universal sensor model trained solely on the single dataset would be effective for the other sensor devices (i.e., whether the universal sensor model can effectively respond to sensor data from other sensor devices that did not provide image datasets). Model trainer 106 may be configured to perform these determinations.

One factor considered by the model trainer 106 includes whether, for the application as a whole, is the range of targets in the application defined or well understood. This is because the more ambiguously the target set (i.e., the set of targets to be identified by the universal model trainer) is defined, the more important it will be to have a diversity of datasets. In contrast, the clearer the definition of the target set, the less important the need for multiple datasets.

Other factors include, for each single sensor device dataset individually:

Whether the targets in the dataset were chosen with reference to a list of application targets;

Whether the number of specific samples of the target subtype is large enough to reflect the variations within that subtype within subtypes of similar targets;

The degree that the selection of the targets was arbitrary;

Whether all, or a defined subset of data samples, come from the same physical sensor device;

Whether the image datasets are comprehensive or incomplete (i.e. due to resource or time constraints); and Whether ground truth is accurate and comprehensive;

These factors are significant because if individual datasets have non-correlated shortcomings, then more benefit can be expected from combining the datasets to form a combined image dataset.

Other factors considered by the model trainer 106 to determine suitability of combining datasets includes comparing the single sensor device datasets being considered for combination, such as:

Whether the targets in the datasets are chosen primarily through reference to the same list of application targets;

Whether the datasets were created by the same organization or same software; and Whether the datasets created in the same timeframe.

These factors take into consideration that the more similar the data generation processes, the less benefit can be expected from combining datasets.

Another factor for determining whether dataset-combining would be productive for a particular application is consideration of the differences between the sensors and the data they produce. Image datasets from different types of sensor devices in the same class will meet adequate key performance characteristics for a particular application associated with that class. However, underlying this, there may be many other differences in the data. These differences may be categorized as described below.

Model trainer 106 may consider any significant differences in one or more of these characteristics when determining whether to combine datasets. As noted in the table below, characteristics may be characterized based on their importance in the determination by model trainer 106.

The first characteristic categorization is key performance. Any characteristics identified as key performance may be required to be present in the image dataset for inclusion in the sensor class. These will often be higher-level characteristics that reflect the combined influences of other characteristics.

Another characteristic categorization is irreconcilable. Characteristics identified as irreconcilable differ so greatly that combination would not be useful. This might occur if two sensor devices produce similar data for the same application but by very different mechanisms. For instance, CT and MRI systems both can produce high-resolution volumetric images and can have overlapping applications, but since they are measuring fundamentally different things it is unlikely productive to try to use them as interchangeable inputs for training the same universal sensor model for any sophisticated detection.

Another characteristic categorization is transformable. Many differences between image datasets may be amenable to mathematical definition and transformation. For example, characteristics related to units and measurements can be transformed. For instance, temperature measurements are transformable into a common format that would yield a combined image dataset for training the universal sensor model. If two sensor devices yield temperature measurements but one uses Celcius and the other Fahrenheit, they may be converted to the other, or both to Kelvin. Other differences in characteristics of image datasets may be related to conventions for how datasets are stored in a computer, with differences in variable types, row-major vs. column-major array organization. Finally, there may be differing engineering choices made about how the stored data relates to the what is being measured. These may have more complex transformations, but still mathematically describable. For instance if the data sampling rate (or for imaging sensors, the comparable pixel or voxel size) differs between image datasets, the data within individual datasets can be resampled to a common sampling rate (or pixel or voxel size). Such resampling can reduce the overall bandwidth (and imaging resolution) of the data, but such degradation will generally be small or insignificant since the native bandwidths for all sensor devices are required to meet imaging resolution and contrast requirements as defined for the particular application. In many cases the ground truth portion of datasets will also need transformation so that the information is available in a common format.

Examples of transformation for CT systems include spatial transformation and density transformation. For spatial transformation, the physical distance corresponding to the spacing between voxels can vary between sensor devices, and between data axes, and data from each sensor device is re-sampled into a common voxel spacing, likely the smallest spacing of any sensor device, since resampling to smaller spacings will better preserve imaging resolution. The resampling may be linear or higher-order. For density transformation, different sensor device reconstructions may have a different mapping between the digital values for each voxel and the physical density that they represent. Accordingly, model trainer 106 may transform the data from each sensor device such that the same digital number refers to the same density.

Another characteristic categorization is accommodatable. There can be many variations between the image datasets produced by different sensor devices that are not transformable. One example is an image artifact. This categorization indicates whether a trained universal sensor model can accommodate variations in these particular characteristics.

Another characteristic categorization is not significant. Sometimes datasets will include information not pertinent to the application, or that differ in ways easily accommodated by the universal sensor model. If this information differs between device datasets, or is even not present in one, it doesn't matter. An example might be the presence of date information in one product's data and not in the others when the date is not pertinent to the goal. Another example of likely "Not significant" characteristic for the case of CT images would be the overall size of an image in voxels: since CT images produced by a single product generally produce images that vary in size in at least one dimension. Therefore, universal sensor models for such CT products may accommodate such variations.

Table A below describes some of these differences for CT systems with regard to particular characteristics, a description of the characteristic, whether the characteristics are important for the particular application, and a rationale as their importance.

| Characteristic | Description | Characteristic Categorization | Rationale |
|---|---|---|---|
| Maximum dimensions of object measured | The maximum size of an object that can be measured for each dimension | Key performance | Application defines the target objects to be measured |
| Overall Image Spatial Resolution | The ability to distinguish a small object from its neighbors; depending on the application, the requirement might either be to detect the presense of the object, or to measure its density | Key performance | This will directly effect what objects can be detected or measured by the system |
| Voxel Size | The size of the physical volume represented by each voxel | Transformable | Mathematically-defined resampling is feasible, though may impact Spatial Resolution |
| Image size | The number of voxels in each dimension of the image data array | Accomodatable or Transformable | Existing models already accomodate image size variation in at least the belt dimension |
| Density dynamic range | The range of densities that can be measured | Key performance | The application will be looking at objects in a given density range |
| Digital Value/Density mapping | The relationship between a digital value in the data array and the physical density that it represents? | Transformable | Mathematically-defined, given calibration points from all sensor devices |
| Density precision | How small a variation in density can be reliably measured | Key performance or accomodatable | The application may or may not have requirements to discern objects against a background of only slightly differing density |
| Density accuracy | How close the measured density is to the actual density of the corresponding volume of the physical object measured | Key performance or accommodatable | The application may or may not have requirements to measure accurate density |
| Sensitivity to anomalies smaller than the spatial resolution | How small of a smaller-than-spatial-resolution anamalous-density object can be detected? As one example: what is the smallest diameter copper wire that can be detected passing through open space? | Key performance or accommodatable | The application may have requirements to detect sub-resolution objects such as thin wires |
| Noise level and character of Noise | The random variation in the accuracy of a measured density | Accomodatable | So long as this variation doesn't compromise key performance characteristics, robust datasets should allow a univeral sensor model to accomdate these variations |
| Artifacts | The amount of systemmatic variation in the accuracy of a measured density; for instance, related to position in the object or to densities in other parts of the object. In CT systems, many artifacts result from the image reconstruction process. | Accomodatable | So long as this variation doesn't compromise key performance characteristics, robust datasets should allow a univeral sensor model to accommodate these variations |

Finally, dataset processor 104 and/or model trainer 106 may make a decision about the utility of creating a combined dataset upon which to train the universal sensor model after completing the evaluation of the datasets.

In 402, dataset processor 104 and/or model trainer 106 may determine not to proceed with combining the image datasets. Some factors that may lead to this determination include the datasets have characteristic differences that are irreconcilable and are significant, the application is so well defined that there is no ambiguity in the range and size requirements for the datasets, the process of obtaining target samples is so simple that there are few possible sources of bias in the data. Model trainer 106 may be configured to weigh the positive benefits of dataset combination against the potential negative factors of data degradation through transformation and increased demands on training the universal sensor model from complexity added by the combination. Some of the positive benefits may include the operational benefits of having a single universal trained model for processing input data.

In 404, model trainer 106 may begin creating the combined image dataset from which the universal sensor model will be trained and tested. In some embodiments, the creation of the combined image dataset also takes into consideration the characteristic categorizations discussed with respect to 402.

For each transformable characteristic, model trainer 106 may determine how that characteristic should be represented in the combined dataset—generally one that will require the least data-degrading transformation and thus preserve the quality of the data. For example, if the input datasets differ in bandwidth, it may be best to have the combined dataset use the bandwidth of the source that has the highest bandwidth, because up-sampling generally reduces information content less than down-sampling. On the other hand if the bandwidth is higher than required for an application then an engineering judgement might be made that the data storage and processing efficiencies of fewer data samples may justify using a lower bandwidth for the combined dataset.

Then for each single product, a procedure may be defined to transform its data to match characteristics of the combined training dataset. As an example for CT scanner products with different spatial resolution (different pixel or voxel sizes), model trainer may implement procedures for image characteristics. For example, a preferred transformed pixel/voxel size would likely be the smallest of the individual sensor devices, or it might be nearly the smallest and also related to the other larger pixel/voxel sizes by a small integer multiple. In such a case, the transformations defined for the image dataset would be linear or higher-order interpolation of density value to match the new voxel grid locations. Similarly, all image-related coordinates or distances such as ground truth bounding box descriptions would be scaled by the ratio of the original and transformed voxel sizes along each axis. Note that for some sensor types some characteristics may already match the desired combined characteristics and no transformation may be required.

Once all the transformations are defined that map the individual product type characteristics to the combined dataset characteristics, each dataset can be transformed using the transformations specific to it. Both training and test portions of each dataset should be transformed, including their ground truth information. This will create a set of transformed single sensor device datasets that differ only in not significant or accommodatable or key performance characteristics. Although key performance characteristics may differ between image datasets, all key performance characteristics must be adequate to meet the requirements of the end user's application goal.

After these considerations, dataset processor 104 and/or model trainer 106 may merge the datasets to create a combined image dataset to train the universal sensor model.

In 406, dataset processor 104 and/or model trainer 106 trains the universal sensor model based on the combined image dataset. The universal sensor model is trained to identify one or more targets (as noted by the ground truth information) within the dataset. The result of this training is a universal sensor model that is capable of processing data from sensor devices by processing (transformed) image datasets and performing target detection on the image datasets to identify targets.

In 408, the trained universal sensor model is evaluated. Metrics for evaluating the universal sensor model may be dependent on the application for which the universal sensor model is to be utilized. For example, for an object detection application, these metrics might include probability of detection ("Pd") and probability of false alarm ("Pfa"), or their more general expression in receiver-operating-characteristic curve ("ROC").

Evaluating the efficacy of the trained universal sensor model may be based on comparing the performance of the universal sensor model trained from the combined image dataset to a model developed with and applicable only to an image dataset from a single sensor device. Evaluation may include steps for testing the universal sensor model using the combined (transformed) test dataset and also any transformed test datasets from each of the individual devices, testing each single-sensor device model using the (untransformed) test set from that sensor device only, and comparing the performance of both the universal sensor model and the single-sensor device model considering both the measured test results and the confidences that the test results adequately reflect real use (i.e., determining whether the range of targets in the test set provide sufficient confidence of performance in real world use).

A universal sensor model that was trained with a combined transformed image dataset, can be tested using its own combined transformed test set. In some embodiments, a test may be implemented as a fully independent test set including an exhaustive range of test targets acquired from each sensor device although in the real world this may be difficult to obtain due to resource constraints. To compare the performance of a given universal sensor model trained with a combined transformed dataset with a single sensor model trained with its own single image dataset, the universal sensor model performance can be measured using only the same transformed single sensor device test set data and not the combined dataset from all the sensor devices. This is a "head to head" comparison because both models are tested against the same set of images, the universal sensor model uses the transformed version of the same images used to test the single sensor model.

Model trainer 106 may perform an evaluation of the results of the test for the universal sensor model and each of the single sensor models. Model trainer 106 may be configured to take into account imperfect test sets (lacking size, variation, or having bias), although it is noted that the combined test set (containing test data from all the single sensor device types combined into one) may be less imperfect than the single test sets from each of the single sensor models.

Combining data, such as test sets and image datasets, from multiple sensor device types can address situations when there are imperfections in a dataset. For example, imperfections may be shared between the training and test datasets which masks any negative effects of those imperfections. Accordingly, a sensor model trained on a single image dataset which tests well may perform poorly in use on targets not well represented in its training dataset. A combined test set will be larger and generally more diverse. For this reason, a universal sensor model trained from a combined image dataset will generally perform more accurately against a broad set of targets than a single sensor model trained from a single image dataset.

Datasets may also be updated over time with additional datasets provided from sensor devices within the same class, that may be of different types, and that may have contributed to the initial combined dataset. In this manner, datasets may be continuously updated based on data collected and/or otherwise provided by different sensor devices within the same class. As a non-limiting example, after a combined dataset is formed from one or more datasets from one or more sensor devices, the universal sensor model may receive one or more additional datasets from the one or more sensor devices and update the combined dataset based on the one or more additional datasets by combining the datasets together in the manner discussed above.

In 410, if it is determined that the trained universal sensor model is beneficial for the application, then the resulting model may be used in an operational role such as in communication with first CT scanner 208A or second CT scanner 208B.

If a transformation was created from a single product characteristic to the combined dataset characteristic, then the universal sensor model may utilize a reverse transformation to transform datasets from the combined dataset characteristic to the single product characteristic so as to generate an output that has characteristics compatible with the particular sensor device. In some embodiments when universal sensor model is implemented as a system, the reverse transformation may be performed by another component of the system.

In 412, model trainer 106 may incorporate datasets representing novel or new targets from a subset of the sensor devices into the combined image dataset and retrain the universal sensor model. This results in enhancing the capability of the universal sensor model to detect the novel targets for all sensors when only a subset or a single sensor type contributed the novel or new target data. This allows model trainer 106 to incorporate new targets detected by a single sensor device into the universal sensor model which can then detect those new targets across all sensor devices of the same class. As noted above, the novel or new targets may be provided by a sensor device, such as sensor device 110A, or a synthetic sensor device, such as synthetic sensor device 118. In some aspects, if novel targets are later identified, additional data for the novel targets from one or more sensor devices may be added to the combined training dataset. A trained universal sensor model may then be created based on the combined dataset that includes the novel targets.

If in 408 the model trainer 106 determines that the universal sensor model does not provide any benefit for detecting targets, then in 414 an evaluation can be made regarding whether additional data or engineering decisions might improve matters. If so, a revised process 402 can incorporate those changes. If not, then the process ends at 416.

Example Computer System

Figure 5:
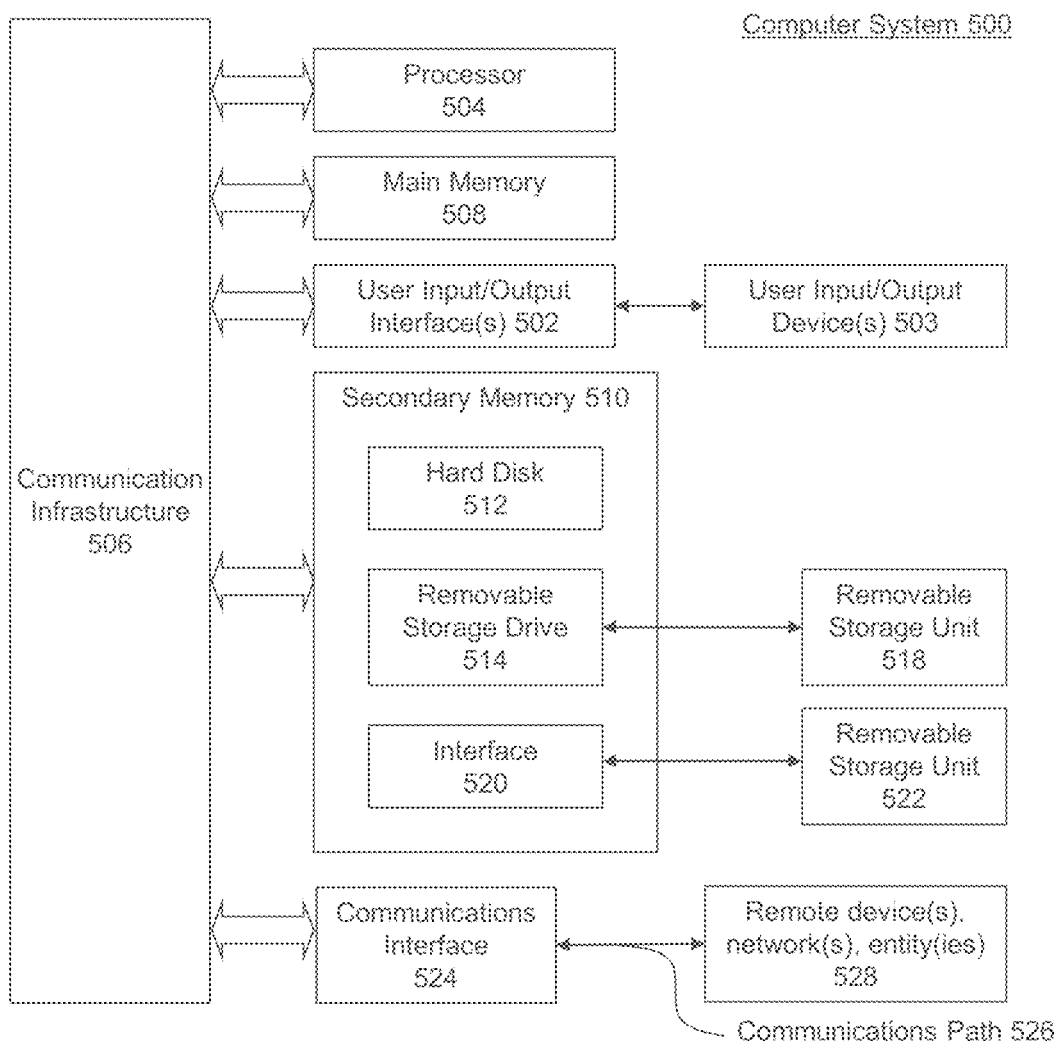
FIG. 5 illustrates an example computer system useful for implementing various embodiments.

Various aspects may be implemented, for example, using one or more well-known computer systems, such as computer system 500 shown in FIG. 5. For example, the model trainer 106 and model backend system 202 may be implemented using combinations or sub-combinations of computer system 500. Also or alternatively, one or more computer systems 500 may be used, for example, to implement any of the aspects discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500 or processor(s) 504), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 5. In particular, aspects can operate with software, hardware, and/or operating system implementations other than those described herein.

Conclusion

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other. The breadth and scope of this disclosure should not be limited by any of the above-described exemplary embodiments, but should be defined only in accordance with the following claims and their equivalents.

What is claimed is:

1. A computer-implemented method for performing target detection using a trained universal sensor model, the computer-implemented method comprising:
producing, by at least one computer processor, the trained universal sensor model using a training dataset by:
receiving, from a plurality of sensor devices, a first dataset and a second dataset, wherein the first dataset is provided by a first sensor device of the plurality of sensor devices, the second dataset is provided by a second sensor device of the plurality of sensor devices, wherein the plurality of sensor devices comprises a device class, and the first sensor device is a different sensor type than the second sensor device;
determining, based on one or more suitability criteria, whether to combine the first dataset and the second dataset;
generating, based on the determining, the training dataset by combining the first dataset and the second dataset; and
training the trained universal sensor model to identify one or more targets in the training dataset;

receiving, from a sensor device of the device class, a new dataset;
performing, by the trained universal sensor model, the target detection on the new dataset in response to receiving the new dataset, wherein the target detection comprises determining whether the one or more targets are in the new dataset;
generating an output indicating a result of the target detection on the new dataset; and
transmitting the output to a decision node.

2. The computer-implemented method of claim 1, wherein the first dataset comprises first image data provided by the first sensor device and the second dataset comprises second image data provided by the second sensor device.

3. The computer-implemented method of claim 2, wherein the first sensor device is a first type of the device class and the second sensor device is a second type of the device class.

4. The computer-implemented method of claim 3, wherein the device class comprises a computed tomography (CT) scanner, the first type of the device class comprises a first manufacturer of the first sensor device, and the second type of the device class comprises a second manufacturer of the second sensor device.

5. The computer-implemented method of claim 3, wherein the first dataset comprises a first characteristic associated with the first type of the device class and the second dataset comprises a second characteristic associated with the second type of the device class.

6. The computer-implemented method of claim 5, wherein the first characteristic and the second characteristic comprise one or more of image resolution, a presence of one or more artifacts, pixel size, density dynamic range, density precision, and density accuracy.

7. The computer-implemented method of claim 1, further comprising:
receiving a third dataset from a third sensor device;
determining, based on one or more suitability criteria, whether to combine the first dataset, the second dataset, and the third dataset; and
updating, based on the determining, the training dataset by combining the first dataset, the second dataset, and the third dataset.

8. The computer-implemented method of claim 1, wherein a third sensor device is the first sensor device.

9. The computer-implemented method of claim 1, wherein a third sensor device is different from the first sensor device.

10. The computer-implemented method of claim 1, wherein the first dataset, the second dataset, the training dataset, and the new dataset comprise image data.

11. A system comprising:
one or more memories;
at least one processor coupled to at least one of the memories and configured to perform operations for performing target detection using a trained universal sensor model, the operations comprising:
producing the trained universal sensor model using a training dataset by:
receiving, from a plurality of sensor devices, a first dataset and a second dataset, wherein the first dataset is provided by a first sensor device of the plurality of sensor devices, the second dataset is provided by a second sensor device of the plurality of sensor devices, wherein the plurality of sensor devices comprise a device class, and the first sensor device is a different sensor type than the second sensor device;
determining, based on one or more suitability criteria, whether to combine the first dataset and the second dataset;
generating, based on the determining, the training dataset by combining the first dataset and the second dataset; and
training the trained universal sensor model to identify one or more targets in the training dataset;
receiving, from a third sensor device of the plurality of sensor devices, a new dataset;
performing, by the trained universal sensor model, the target detection on the new dataset in response to receiving the new dataset, wherein the target detection comprises determining whether the one or more targets are in the new dataset;
generating an output indicating a result of the target detection on the new dataset; and
transmitting the output to a decision node.

12. The system of claim 11, wherein the first dataset comprises first image data captured by the first sensor device and the second dataset comprises second image data captured by the second sensor device.

13. The system of claim 12, wherein the first sensor device is a first type of the device class and the second sensor device is a second type of the device class.

14. The system of claim 13, wherein the device class comprises a computed tomography (CT) scanner, the first type of the device class comprises a first manufacturer of the first sensor device, and the second type of the device class comprises a second manufacturer of the second sensor device.

15. The system of claim 13, wherein the first dataset comprises a first characteristic associated with the first type of the device class and the second dataset comprises a second characteristic associated with the second type of the device class.

16. The system of claim 15, wherein the first characteristic and the second characteristic comprise one or more of image resolution, a presence of one or more artifacts, pixel size, density dynamic range, density precision, and density accuracy.

17. The system of claim 11, wherein the operations further comprise:
receiving a third dataset from the third sensor device;
determining, based on the one or more suitability criteria, whether to combine the first dataset, the second dataset, and the third second dataset; and
updating, based on the determining, the training dataset by combining the first dataset, the second dataset, and the third dataset.

18. A non-transitory computer readable medium having instructions stored thereon that, when executed by at least one computing device, cause the at least one computing device to perform operations for performing target detection using a trained universal sensor model, the operations comprising:
producing a trained universal sensor model using a training dataset by:
receiving, from a plurality of sensor devices, a first dataset and a second dataset, wherein the first dataset is provided by a first sensor device of the plurality of sensor devices, the second dataset is provided by a second sensor device of the plurality of sensor devices, and wherein the plurality of sensor devices comprise a device class;

determining, based on one or more suitability criteria, whether to combine the first dataset and the second dataset;

generating, based on the determining, the training dataset by combining the first dataset and the second dataset; and training the trained universal sensor model to identify one or more targets in the training dataset;

receiving, from a third sensor device of the plurality of sensor devices, a new dataset;

performing, by the trained universal sensor model, the target detection on the new dataset in response to receiving the new dataset, wherein the target detection comprises determining whether the one or more targets are in the new dataset;

generating an output indicating a result of the target detection on the new dataset; and transmitting the output to a decision node.

19. The non-transitory computer readable medium of claim 18, wherein the first dataset comprises first image data captured by the first sensor device and the second dataset comprises second image data captured by the second sensor device.

20. The non-transitory computer readable medium of claim 19, wherein the plurality of sensor devices comprise sensor devices of the device class and wherein the first sensor device is a first type of the device class and the second sensor device is a second type of the same class.

* * * * *